Feb. 25, 1930.                W. H. MÖLLER                1,748,891
                            BINDER ATTACHMENT
                            Filed Dec. 2, 1927
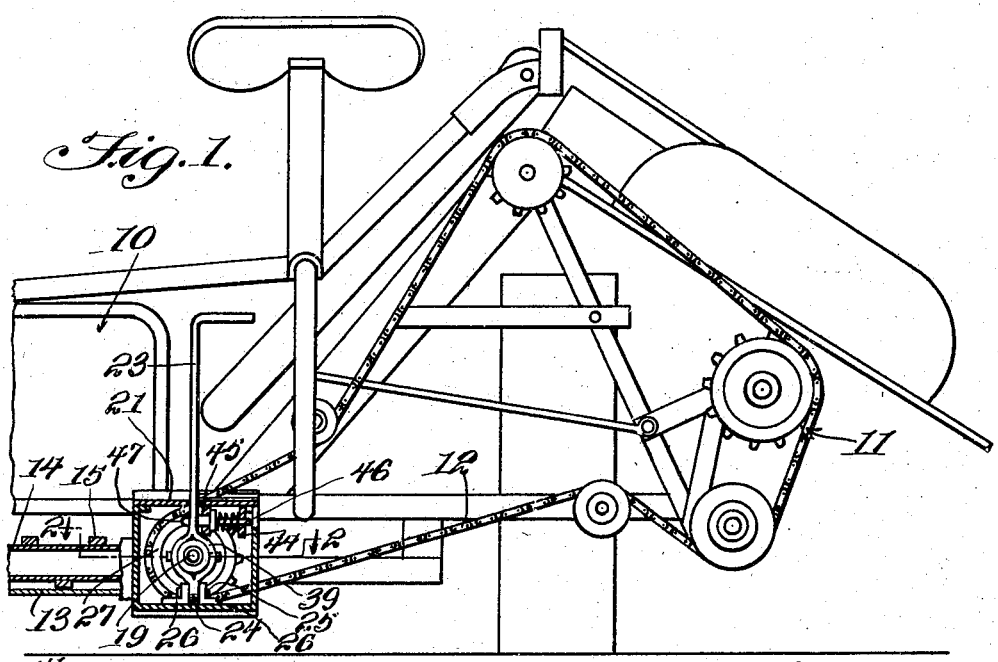
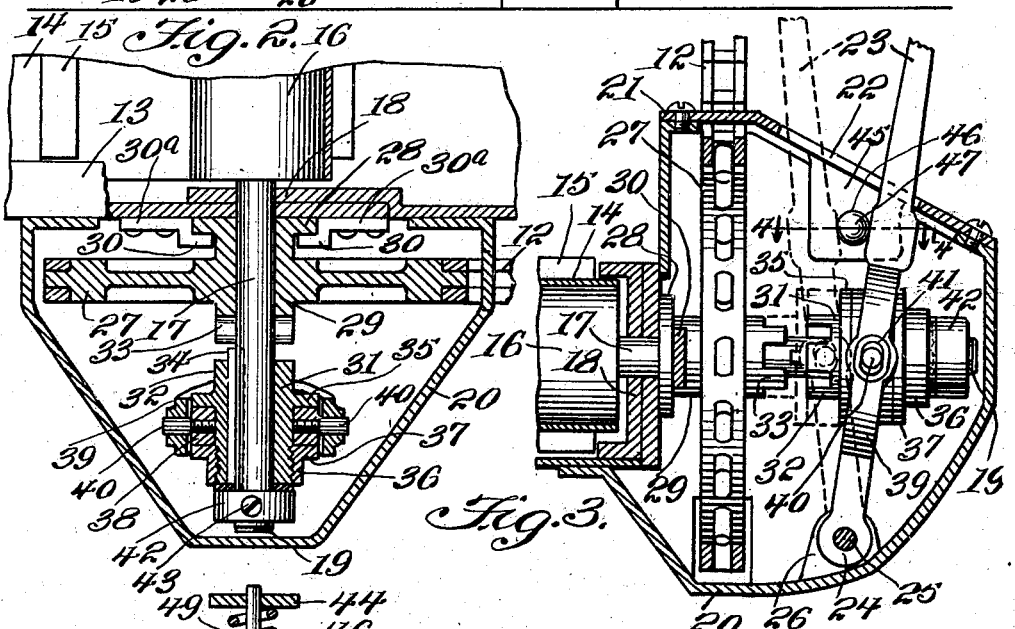
Wilhelm H. Möller
INVENTOR
BY Victor J. Evans
ATTORNEY
WITNESS: J. T. L. Wright Patented Feb. 25, 1930

1,748,891

UNITED STATES PATENT OFFICE

WILHELM H. MÖLLER, OF WESSINGTON, SOUTH DAKOTA

BINDER ATTACHMENT

Application filed December 2, 1927. Serial No. 237,261.

The present invention relates to binder attachments and has for its objects to provide means whereby the platform apron may be readily placed in and out of driven connection with the driving mechanism of the binder.

Other objects are to provide novel and effective means for accomplishing this purpose which will insure connection when such connection is desired and will insure against such connection when such connection is not desired.

Other objects are simplicity of construction, effectiveness in use, simplicity and cheapness of manufacture and simplicity of operation.

Other objects and advantages will appear from the following specification and will be set forth in the subjoined claim.

Referring to the drawings which constitute a part of the present specification:—

Figure 1 is a fragmentary view showing a part of a binder and showing the invention constituting the subject of the present application in section.

Figure 2 is an enlarged view compared with Figure 1 showing the invention in section on the line 2—2 of Figure 1.

Figure 3 is a section at right angles to that shown in Figure 2 and on the line 3—3 of Figure 2.

Figure 4 is a fragmentary detail view showing the latching mechanism by which the clutch mechanism is held either in or out of clutching position.

Referring to the drawings in detail by reference numerals, 10 designates a binder having drive mechanism 11 thereon which constitutes a plurality of sprocket wheels and rollers and a sprocket chain 12 trained thereabout, the sprocket wheels being driven from a source of power in a well known manner. 13 designates the platform of the binder above which is positioned the platform canvas 14 in the form of an endless belt having cleats 15 thereon for carrying the straw thereover, the endless belt being trained about suitable rollers, one of which is shown at 16 as mounted on a shaft 17 journaled in suitable bearings as at 18 and having a projecting portion 19 extending beyond one of said bearings into a clutch casing 20 secured to the binder. The top 21 of the casing is suitably slotted as at 22 to permit of the necessary movements of the clutch lever 23 which is pivotally mounted at its lower end to the bottom of the casing as shown at 24 and a bolt 25 secured between two upstanding ears 26. Loosely mounted upon the extension 19 of the shaft 17 is a sprocket wheel 27 in driven connection with the sprocket chain 11 and secured against longitudinal movement of the shaft extension 19 by means of a flange 28 secured to the hub 29 thereof, said flange resting against one wall of the casing and being held in place by members 30ª secured to said wall and having off-set fingers 30 adapted to lie in radial relation to said flange and against the surface thereof opposite to the above mentioned wall as clearly shown in Figure 2. Slidably, but non-rotatably mounted upon the extension 19 is a clutch collar 31 having a clutch member 32 thereon adapted to be brought into articulate relation with a similar clutch member 33 on the hub. The collar 31 is provided with a longitudinal groove having received therein a longitudinally extending spline 34 located on the shaft extension 19 whereby the rotation of the collar is prevented while permitting sliding movement thereof. The collar 31 is provided with a radial extending flange 35 formed integrally therewith and a removable collar 36 threaded to the opposite end thereof and having a flange 37 similar to that shown at 35 formed thereon, the two flanges being designed to lie in spaced relation to each other and to receive therebetween a ring 38 to which the yoke 39 formed on the lever 23 is pivotally connected by means of threaded lugs 40 secured to said ring and having their outer ends riding in elongated slots 41 formed in said yoke at diametrically opposite points. The ring 38 is loosely mounted on the collar 31 to afford a certain amount of play relative thereto in the operation of the lever. The collar is prevented from disengagement with the extension 19 by means of a ring member 42 threadedly connected therewith and being prevented from accidental displacement by the set screw 43. Extending from the top of the casing are apertured bracket members 44 and 45, the apertures of said bracket members being in alignment with each other and having slidably mounted therein, a shouldered detent 46 having a bullet shaped and rounded end at 47, having at its rear end a flange 48 providing the above mentioned shoulder. Between the shoulder and the bracket 44 is provided a helical spring 49, the ends of which abut respectively the shoulder and the bracket.

The operation of the clutch mechanism is as follows: When it is desired to place the apron 14 in connection with the driving mechanism of the binder, the lever 23 is moved to the left (considering the mechanism as shown in Figure 3) and such movement will force the head 47 out of its path in such movement. The head 47 will turn to its normal position as soon as the lever has past, preventing the same from turning to the full line position as shown in Figure 3. Similarly, when it is desired to throw the apron out of driven connection, the lever is moved to the right from the dotted position and the full line position as shown in Figure 3, the detent 46 acting in the same manner as just described. Such movements will obviously throw the clutch member into and out of articulate relation to each other and will start or stop the belt from rotation.

Advantages of the provision of a clutch of this character in this connection is that the apron may be disconnected from the guiding means without disconnecting the other elements of the machine and the apron may be revolved about the rollers to disconnect the matter such as corn stalks which may become entangled therewith or may become lodged between the apron and the apron platform.

Having described my invention what I claim is:—

In combination with a binder having a platform apron thereon, a roller for driving said platform apron, a shaft extension connected with said roller, a sprocket wheel rotatably mounted on said extension and having a clutch element on one face thereof, a clutch collar slidably but non-rotatably mounted on said shaft extension and having a clutch element thereon adapted to co-operate with the clutch element on the sprocket wheel, a casing enclosing said shaft extension and clutch, and having a slot in the top thereof, a yoked lever pivotally mounted within the casing and having pivotal connection with said collar, said lever projecting through said slot, spaced flanges depending from the top of the casing adjacent said slot, and a detent yieldably and slidably mounted on said flanges to extend across the path of movement of said lever.

In testimony whereof I affix my signature.

WILHELM H. MÖLLER.